United States Patent [19]

Morita et al.

[11] Patent Number: 4,996,652

[45] Date of Patent: Feb. 26, 1991

[54] SYSTEM FOR DISPLAYING IMAGE OF EXTENDED AREA

[75] Inventors: Toshiya Morita; Sumio Kita; Hiroshi Kamada, all of Nara, Japan

[73] Assignee: Sharp Kabushiki Kaisha, Osaka, Japan

[21] Appl. No.: 185,144

[22] Filed: Apr. 22, 1988

[30] Foreign Application Priority Data

Apr. 22, 1988 [JP] Japan ................................ 62-100862

[51] Int. Cl.[5] ............................................. G06F 15/20

[52] U.S. Cl. .................................... 364/521; 340/798; 364/518

[58] Field of Search ................ 364/518, 521; 340/723, 340/750, 798–800; 382/44–48

[56] References Cited

U.S. PATENT DOCUMENTS

| | | | |
|---|---|---|---|
| 4,467,443 | 8/1984 | Shima | 364/900 |
| 4,604,615 | 8/1986 | Funahashi | 340/799 X |
| 4,628,467 | 12/1986 | Nishi et al. | 340/799 X |
| 4,663,619 | 5/1987 | Staggs et al. | 340/799 X |
| 4,704,697 | 11/1987 | Kiremidjian et al. | 364/518 |
| 4,769,640 | 9/1988 | Sato | 340/799 |
| 4,773,026 | 9/1988 | Takahara et al. | 340/799 X |
| 4,803,475 | 2/1989 | Matsueda | 340/799 X |

*Primary Examiner*—Gary V. Harkcom
*Assistant Examiner*—H. R. Herndon
*Attorney, Agent, or Firm*—Flehr, Hohbach, Test, Albritton & Herbert

[57] ABSTRACT

A display system includes a memory device, a central processing unit, a converting circuit and a display device. The memory device is for sequentially storing image data at addresses corresponding to positions in line and column directions of an original image to be displayed. The central processing unit controls the overall operation of the system and also retrieves the image data selectably either from every line or every Mth line. The converting circuit sequentially and temporarily stores the retrieved image data by extracting selectably either every bit or every Nth bit of the retrieved image data sequentially, M and N being integers greater than 1. These serial data formed by the converting circuit are displayed by the display device.

6 Claims, 2 Drawing Sheets

SYSTEM FOR DISPLAYING IMAGE OF EXTENDED AREA

BACKGROUND OF THE INVENTION

This invention relates to a system capable of and a method of displaying on a display device such as a cathode ray tube (CRT) an image of an extended area by processing image data retrieved from an original pictorial image and stored in a memory to reduce their resolution.

One of the methods of displaying data on a display device such as a CRT is to store the image data to be displayed in a memory and to display them on a CRT and the like by sequentially retrieving the stored data from the memory. With a prior art display system which uses this method of display, the area of image data inside the memory which can be simultaneously displayed on the screen is uniquely determined by the number of pixels of the display device such as a CRT. Thus, if it is desired to use such a system to reduce the resolution in order to display image data corresponding to a larger area, a typical routine for such a purpose was to thin the image data in the original memory according to the desired change in resolution, to temporarily store such thinned image data in another memory, and to sequentially retrieve the thinned image data to make a display. A display by such a routine is very time-consuming with a prior art display system, however because new display image data must be preliminarily prepared by first thinning the entire image data in an original memory by a specified ratio. Moreover, there is an additional disadvantage in that an additional memory device of a fairly large capacity is necessary for storing the newly created display image data. For this reason, switching between a normal display operation with the ordinary resolution and a reduced display with lowered resolution cannot be effected quickly and the system itself becomes costly.

SUMMARY OF THE INVENTION

It is therefore an object of the present invention to provide a display system with a simple and inexpensive structure capable of simultaneously thinning and retrieving image data from a single memory and directly displaying such image data on a display device such as a CRT such that a reduced display can be made very efficiently.

A display system embodying the present invention, with which the above and other objects can be achieved, is characterized as being comprised of memory means for storing an image to be displayed as image data sequentially at addresses corresponding to the positions in the line (horizontal) and column (vertical) directions, retrieving means for retrieving these image data on every line or every Mth line (M being an integer greater than 1), converting means for sequentially and temporarily storing the image data for each line retrieved by the retrieving means and converting them into serial data by taking them out sequentially or every Nth time (N being also an integer greater than 1) and a display device for receiving and displaying such serial data.

If a display system thus characterized is so set that its retrieving means retrieve image data from every line and that its converting means take out every item from the converted serial data, the retrieving means retrieve sequentially from every line the image data stored at addresses corresponding to the positions in the line and column directions of an original pictorial image and the converting means temporarily store these image data retrieved from every row and convert them into serial data by sequentially taking them out. These serial data are then displayed on the display device as an ordinary image with normal resolution.

If this display system is so set that the retrieving means retrieve image data from every Mth line and the converting means take out a data item every Nth time, however, the serial data similarly obtained are displayed on the display device as a reduced image with resolution reduced by a factor of M (in vertical direction)$\times$N (in horizontal direction).

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
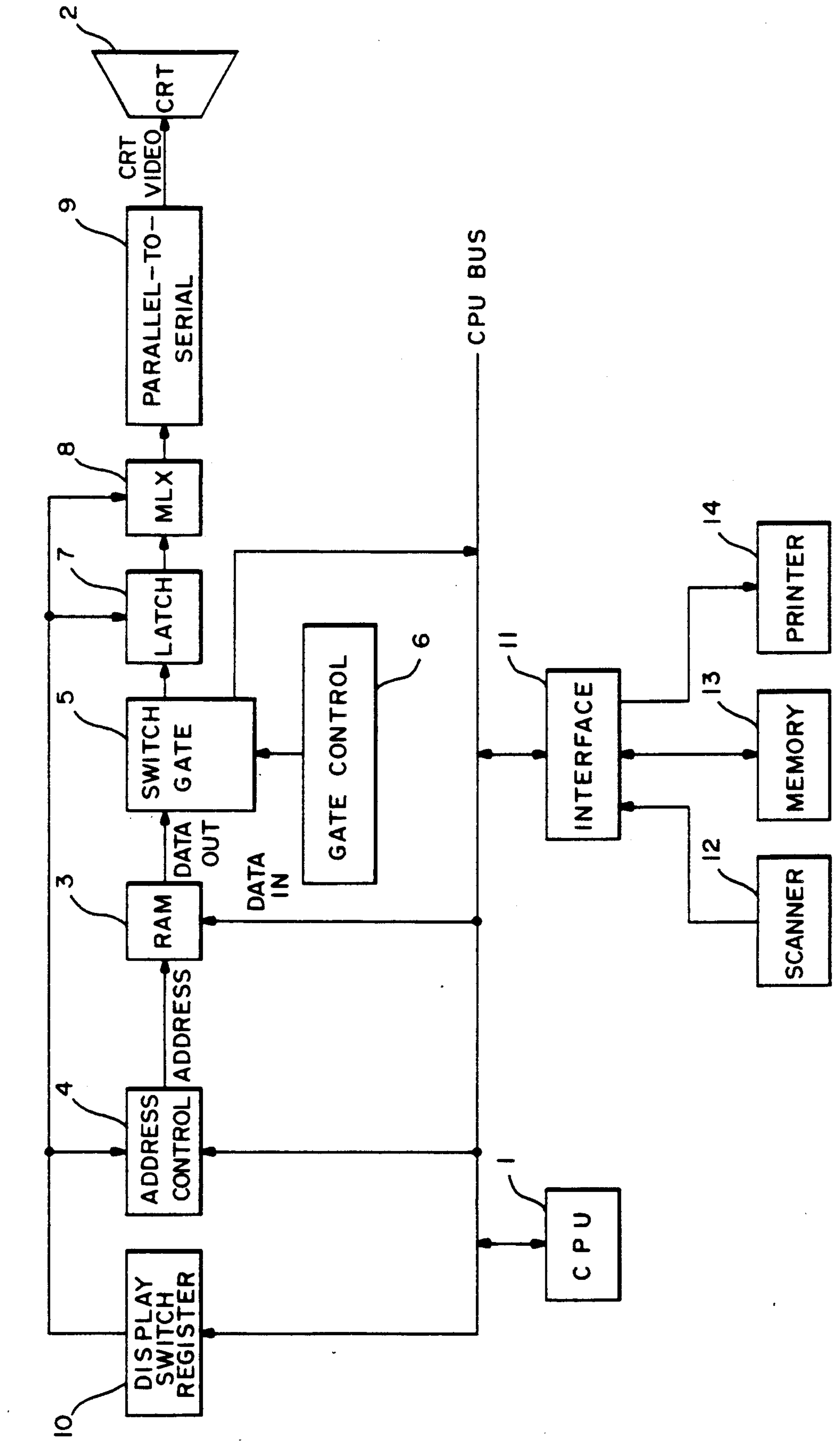
FIG. 1 is a block diagram of a display system embodying the present invention.

With reference to FIG. 1 which is a block diagram of a display system embodying the present invention, numeral 1 indicates a central processing unit CPU which not only controls the operation of the entire system but also serves as the aforementioned retrieving means, and numeral 2 indicates a cathode ray tube (CRT) with 1260$\times$1782 pixels serving as a display device for displaying an image. Numeral 3 indicates a random access memory (RAM) which stores image data, etc. sequentially at addresses corresponding to the positions in the horizontal line and vertical column directions, is accessed by the CPU 1, carries out "video refresh" of the CRT 2 and thereby serves as the memory means of the system. Numeral 4 indicates an address control circuit for generating address signals for the RAM 3 and controlling these signals. Numeral 5 indicates a switch gate for selectively transmitting output data from the RAM 3 either to the CPU 1 or to the CRT 2. Numeral 6 indicates a gate control circuit for outputting an enable signal to this switch gate 5, and numeral 7 indicates a latch for temporarily storing video data for the CRT 3 outputted from the switch gate 5 to match their timing. Numeral 8 indicates a multiplexer (MLX) for selectively transmitting input data from the latch 7 on the basis of display switch signals received from outside. Numeral 9 indicates a parallel-to-serial conversion circuit which converts parallel data selected by the multiplexer 8 into serial data to thereby generate a video signal and outputs it to the CRT 2. Numeral 10 indicates a one-bit display switch register for outputting to the address control circuit 2, the latch 7 and the multiplexer 8 a display switch signal indicative of whether a normal display or a reduced display (with resolution reduced by a factor of MN) is intended. What was referred to above as the converting means includes the latch 7 and the multiplexer 8. Numeral 11 indicates an interface circuit for input/output of image data between the RAM 3 and an external apparatus. Numeral 12 indicates a scanner for inputting image data from an original pictorial image by converting its picture density into electrical signals. Numeral 13 indicates an external memory device for storing image data, and numeral 14 indicates a printer for printing image data on a recording sheet.

Figure 2:
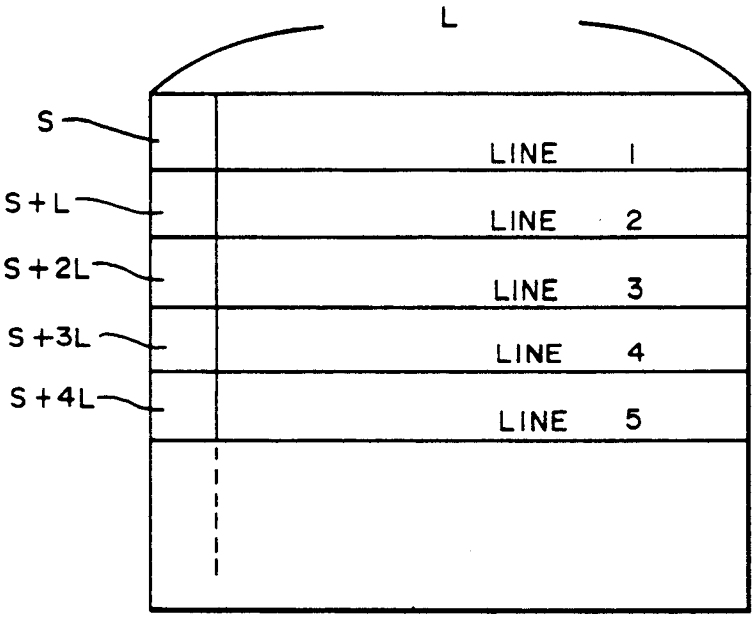
FIG. 2 is a memory map of the RAM shown in FIG. 1.

In FIG. 2 which is a memory map for showing how image data are stored in the RAM 3, L indicates the number of bits corresponding to the length in the line direction of an original pictorial image to be displayed on the CRT 2. The portion of the image data from the start bit to the Lth bit is referred to as an original line. S, S+L, S+2L, . . . shown in the column direction indicate the start addresses of the original lines. Image data are received from an original sheet in units of 12 lines/mm×12 lines/mm through the scanner 12 and inputted into the RAM 3 through the interface circuit 11. These image data are then outputted from the RAM 3 to the parallel-to-serial conversion circuit 9 through the switch gate 5, the latch 7 and the multiplexer 8 which are connected together by 64-bit parallel lines.

If the display switch register 10 is set to "0" to select a normal display mode and the address control circuit 4, upon receiving this display switch signal, specifies S, S+L, S+2L, . . . sequentially in the column direction as the start addresses of data retrieval from the RAM 3, the CPU 1 which also serves as the retrieving means begins to retrieve the image data from the RAM 3 sequentially in units of original lines at the rate of 64 bits per unit time. These retrieved image data are transmitted to the parallel-to-serial conversion circuit 9 through the switch gate 5, the latch 7 and the multiplexer 8 which are mutually connected by the aforementioned 64-bit parallel lines. The parallel-to-serial conversion circuit 9, upon receiving these image data sequentially in the column direction, generates a serial video signal.

If the display switch register 10 is set to "1" to select a reduced display mode, on the other hand, the address control circuit 4, upon receiving this display switch signal, specifies S, S+ML, S+2ML, . . . sequentially in the column direction as the start addresses of data retrieval from the RAM 3 and the address control circuit 4 accordingly retrieves the image data from every Mth original line from the RAM 3. Every Nth bit of each line is taken from these data and transmitted to the parallel-to-serial conversion circuit 9 similarly through the switch gate 5, the latch 7 and the multiplexer 8 mutually connected by the aforementioned 64-bit parallel lines to generate a serial video signal with resolution reduced by a factor of MN. The address control circuit 4 is also adapted to generate horizontal and vertical converting periodic signals corresponding to a display mode based on a signal received from the RAM 3 for the operation of the CRT 2.

Figure 3:
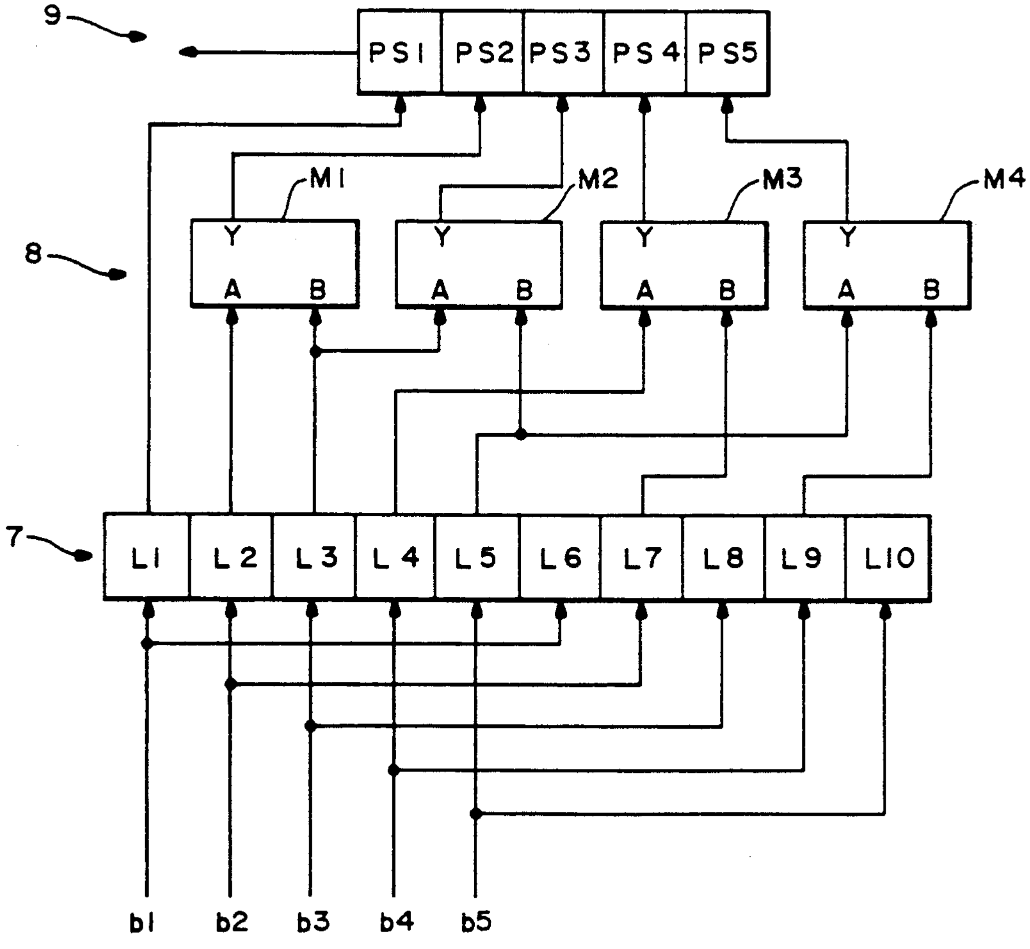
FIG. 3 is a detailed block diagram of the latch, multiplexer and parallel-to-serial conversion circuit of FIG. 1.

The operation of the display system described above is explained next more in detail by way of FIG. 3. For the purpose of simplicity, however, FIG. 3 describes a system using 5-bit parallel lines, instead of 64-bit parallel lines, leading to the parallel-to-serial conversion circuit and both M and N are assumed to be equal to 2 such that resolution is reduced by a factor of 2×2=4. In FIG. 3, therefore, the latch 7 is shown as being comprised of ten 1-bit latch cells L1–L10 and the multiplexer 8 is similarly shown as being comprised of four multiplexer elements M1–M4 each adapted to selectively receive a signal from its input terminal A or B, depending on the aforementioned display switch signal received from the display switch register 10 through it selector terminal (not shown) and to transmit the received signal through its terminal Y. PS1–PS5 indicate a portion of the conversion circuit 9 of FIG. 1, serving as a parallel-to-serial conversion register to store the output data respectively from the first latch cell L1 and the multiplexer elements M1–M4 as shown in FIG. 3.

If the display switch register 10 is set to "0", that is, if the normal display mode is selected, the CPU 1 retrieves image data from the RAM 3 sequentially one original line at a time according to the addresses specified by the address control circuit 2 and the image data corresponding to each original line are transmitted in groups of 5 bits, each group of 5-bit image date being transmitted through the aforementioned 5-bit parallel lines b1–b5 to be temporarily stored as a group in the latch cells L1–L5 sequentially in the column direction. Next, in response to the display switch signal "0" received from the display switch register 10, each of the multiplexer elements M1–M4 transmits data from its A terminal through its Y terminal to a corresponding one of the parallel-to-serial conversion registers PS1–PS5. As a result, the contents of the latch cells L1–L5 are sequentially transmitted to the parallel-to-serial conversion register PS1–PS5, forming a serial video signal for a normal display. The serial video signal thus formed is outputted to the CRT 2 and horizontally and vertically scanned according to CRT driving data to make a display on the CRT with normal resolution.

If the display switch register 10 is set to "1", that is, if the reduced display mode with M=N=2 is selected, the CPU 1 retrieves image data from the RAM 3 sequentially but only from every other row (original line). The image data corresponding to each line are again transmitted in groups of 5 bits but in units of two groups in response to the aforementioned display switch signal of "1" such that the first group of 5-bit image data retrieved from one original line is transmitted through the 5-bit parallel lines b1–b5 to the latch 7 and temporarily stored in the first group of five latch cells L1–L5 sequentially and the second group of 5-bit image data retrieved subsequently from the same original line is similarly transmitted to the latch 7 but is stored in the second group of five latch elements L6–L10. This display switch signal "1" causes the multiplexer elements M1–M4 to receive data through their B terminals and transmit them through their Y terminals. Thus, data in the latch cells L1, L3, L5, L7 and L9 come to be stored sequentially in the parallel-to-serial conversion registers PS1–PS5. As a result, a serial video signal for a reduced display is generated. This serial video signal thus formed is scanned horizontally and vertically within an area reduced by 2×2=4 and a display with resolution reduced by 4 is made on the CRT.

Although a simplified system was illustrated in and explained by way of FIG. 3 for simplicity, a typical system has normal resolution of 12 lines/mm×12 lines/mm and transmits data through 64-bit parallel lines, the CRT 2 having 1260×1782 pixels. With such a typical system, therefore, only about one-quarter of the area of an A4 sheet can be displayed by a normal display. If resolution is reduced by a factor of 2×2=4 to 6 lines/mm×6 lines/mm, the entire image on such a sheet can be displayed simultaneously. Moreover, a switch from a normal display to a reduced display can be effected easily and instantaneously by a command from the CPU 1 to change the content of the display switch register 10.

The foregoing description of a preferred embodiment of the invention has been presented for purposes of illustration and description. It is not intended to be exhaustive or to limit the invention to the precise form disclosed and many modifications and variations are possible in light of the above teaching. In particular, reduction in resolution need not be by a factor of 4 as disclosed. If reduction in resolution by a factor of $3\times3=9$ is desired, for example, a latch with 15 cells L1–L15 as well as multiplex elements M1–M4 with 3 input terminals will be required. It also goes without saying that displays with reduction only in the horizontal or vertical direction can be easily effected with a system of the present invention. Any modifications and variations that may be apparent to a person skilled in the art are intended to be included within the scope of this invention.

What is claimed is:

1. A display system comprising memory means for sequentially storing an original image to be displayed as image data at addresses corresponding to positions in horizontal line and vertical column directions, retrieving means which serves to retrieve selectably every Mth line of said image data, M being an integer greater than or equal to 1, converting means for sequentially and temporarily storing those of said image data retrieved in units of lines by said retrieving means, said converting means serving to convert said retrieved image data into serial data by extracting selectably every Nth one of said retrieved image data sequentially so as to generate a serial video signal for a reduced display, N being also an integer greater than or equal to 1 such that a display of an extended area of said original image can be effected, said converting means including a latch circuit for temporarily storing said image data and a multiplexer for selecting according to a display switch signal a plurality of said image data temporarily stored in said latch circuit, a display device for receiving and displaying said serial data, and a display switch register for storing and transmitting said display switch signal to said latch circuit and to said multiplexer.

2. The display system of claim 1 wherein said retrieving means include a central processing unit which also serves to control the overall operation of said display system.

3. The display system of claim 1 wherein said multiplexer comprises a plurality of multiplexer elements, said latch circuit comprises a plurality of 1-bit latch cells each connected to at least one of said multiplexer elements.

4. The display system of claim 3 wherein said image data are transmitted from said memory means to said converting means through parallel lines.

5. The display system of claim 3 wherein said latch cells are divided into groups and said parallel lines are connected to each of said groups of latch cells.

6. The display system of claim 1 further comprising an address control circuit for generating address signals to be transmitted to said memory means to indicate addresses therein from which said image data are to be retrieved.

* * * * *